Feb. 10, 1953

C. T. MANNING 2,627,713

SUCTION-TYPE SEED HARVESTER

Filed May 6, 1949

INVENTOR.
Clarence T. Manning
BY
McMorrow, Berman & Davidson
ATTORNEYS

Feb. 10, 1953  C. T. MANNING  2,627,713
SUCTION-TYPE SEED HARVESTER
Filed May 6, 1949  3 Sheets-Sheet 2
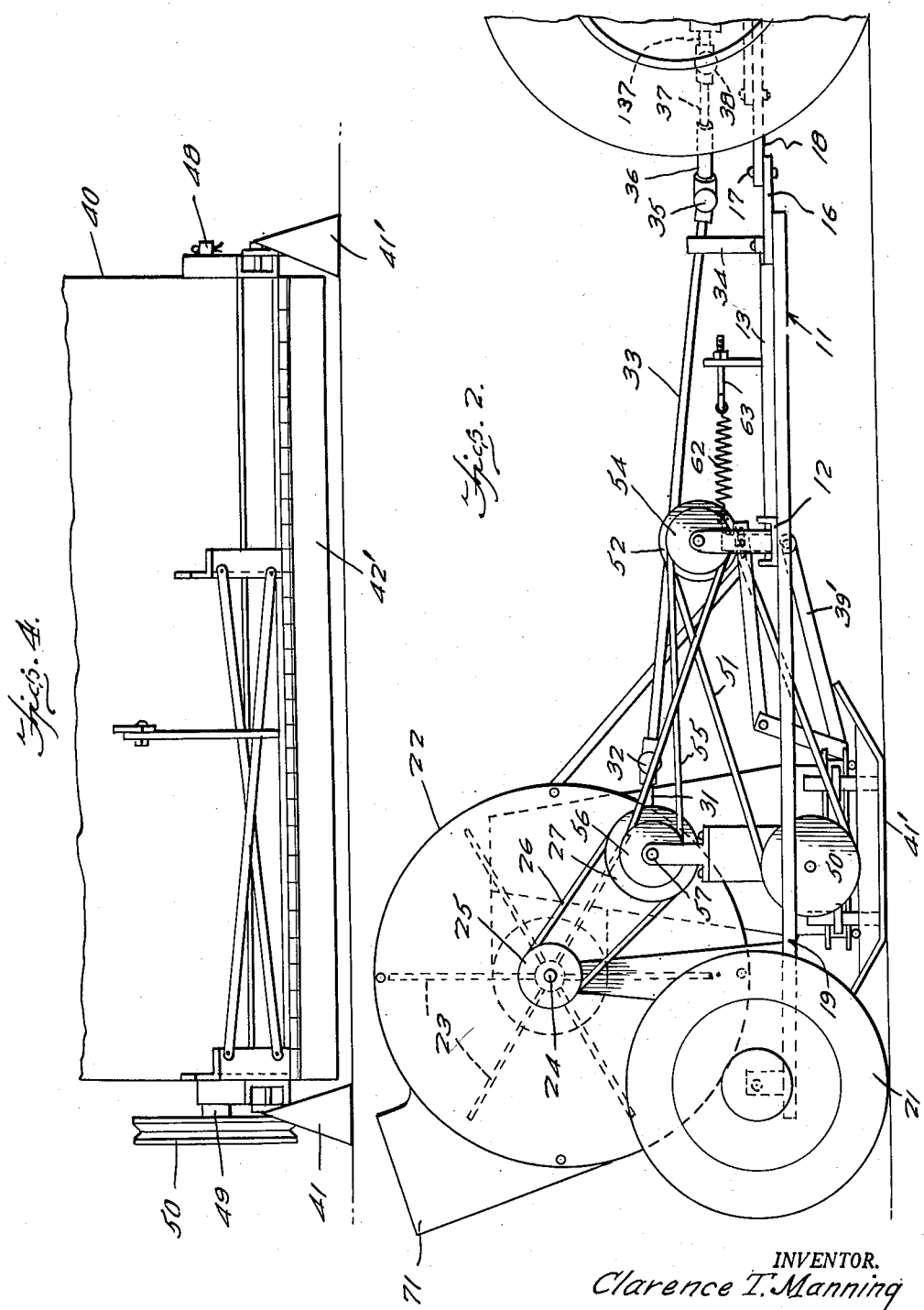
INVENTOR.
Clarence T. Manning
BY
McMorrow, Berman & Davidson
ATTORNEYS Feb. 10, 1953 C. T. MANNING 2,627,713
SUCTION-TYPE SEED HARVESTER
Filed May 6, 1949 3 Sheets-Sheet 3
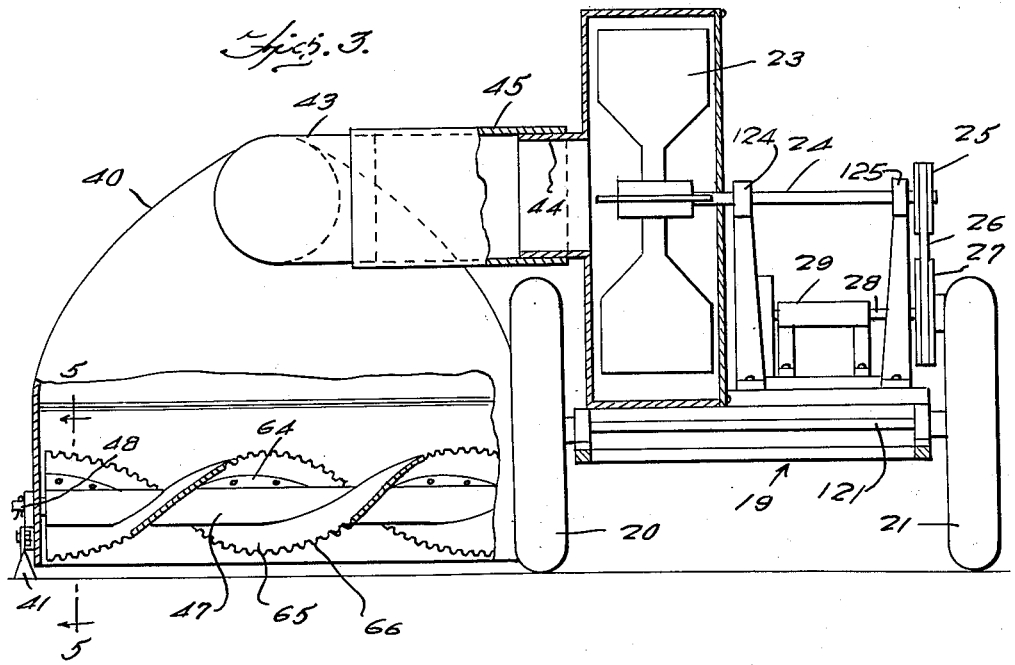
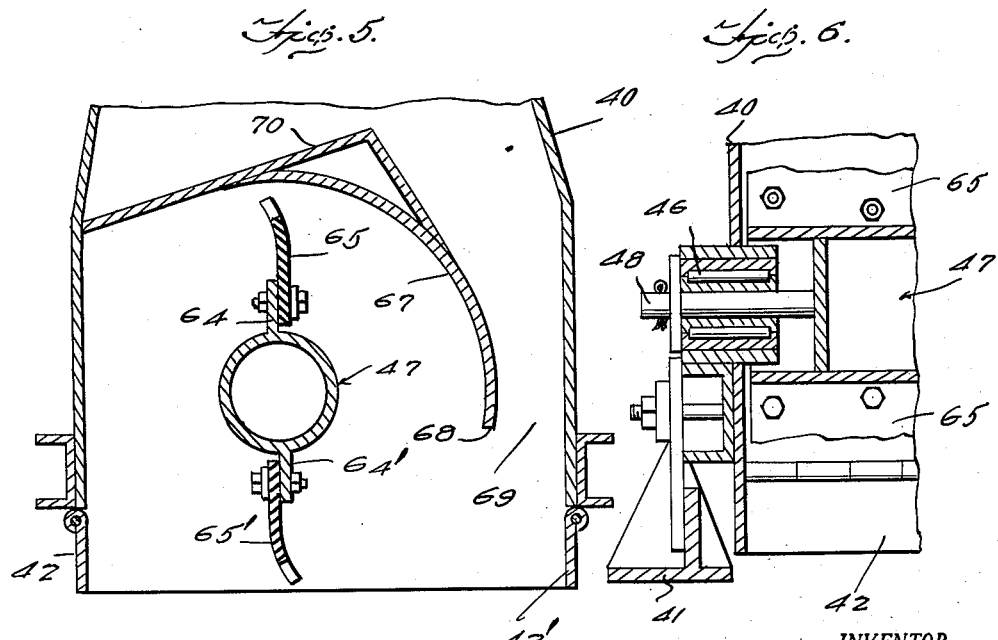
INVENTOR.
Clarence T. Manning
BY
McMorrow, Berman + Davidson
ATTORNEYS Patented Feb. 10, 1953

2,627,713

UNITED STATES PATENT OFFICE 2,627,713

SUCTION-TYPE SEED HARVESTER

Clarence T. Manning, Eagle, Mich.

Application May 6, 1949, Serial No. 91,834

3 Claims. (Cl. 56—19)

This invention relates to harvesting machines, and more particularly to a tractor-drawn machine for gathering seeds and the like by suction action.

A main object of the invention is to provide a novel and improved seed-gathering machine of the suction type which is simple in construction, efficient in operation, and which enables seeds to be harvested from grasses and low-growing plants without first requiring the seeds to be stripped from the plants.

A further object of the invention is to provide an improved suction-type seed-harvesting machine of the tractor-drawn type which will simultaneously strip seeds from their stalks and pick up the seeds, said machine being particularly adapted for harvesting seeds from grasses and other low-growing plants and enabling seeds to be harvested which would not be available for harvesting by the use of the conventional combine or mower.

Further objects and advantages of the invention will become apparent from the following description and claims, and from the accompanying drawings, wherein:

Figure 2 is a side elevational view of the harvesting machine of Figure 1;

Figure 3 is a transverse cross-sectional view taken on line 3—3 of Figure 1;

Figure 4 is a fragmentary front elevational detail view of the lower portion of the intake nozzle member employed in the machine of Figure 1;

Figure 5 is an enlarged cross-sectional detail view taken on line 5—5 of Figure 3;

Figure 6 is an enlarged fragmentary transverse vertical cross-sectional view taken through one of the bearings of the beater member employed in the machine of Figure 1.

Figure 1:
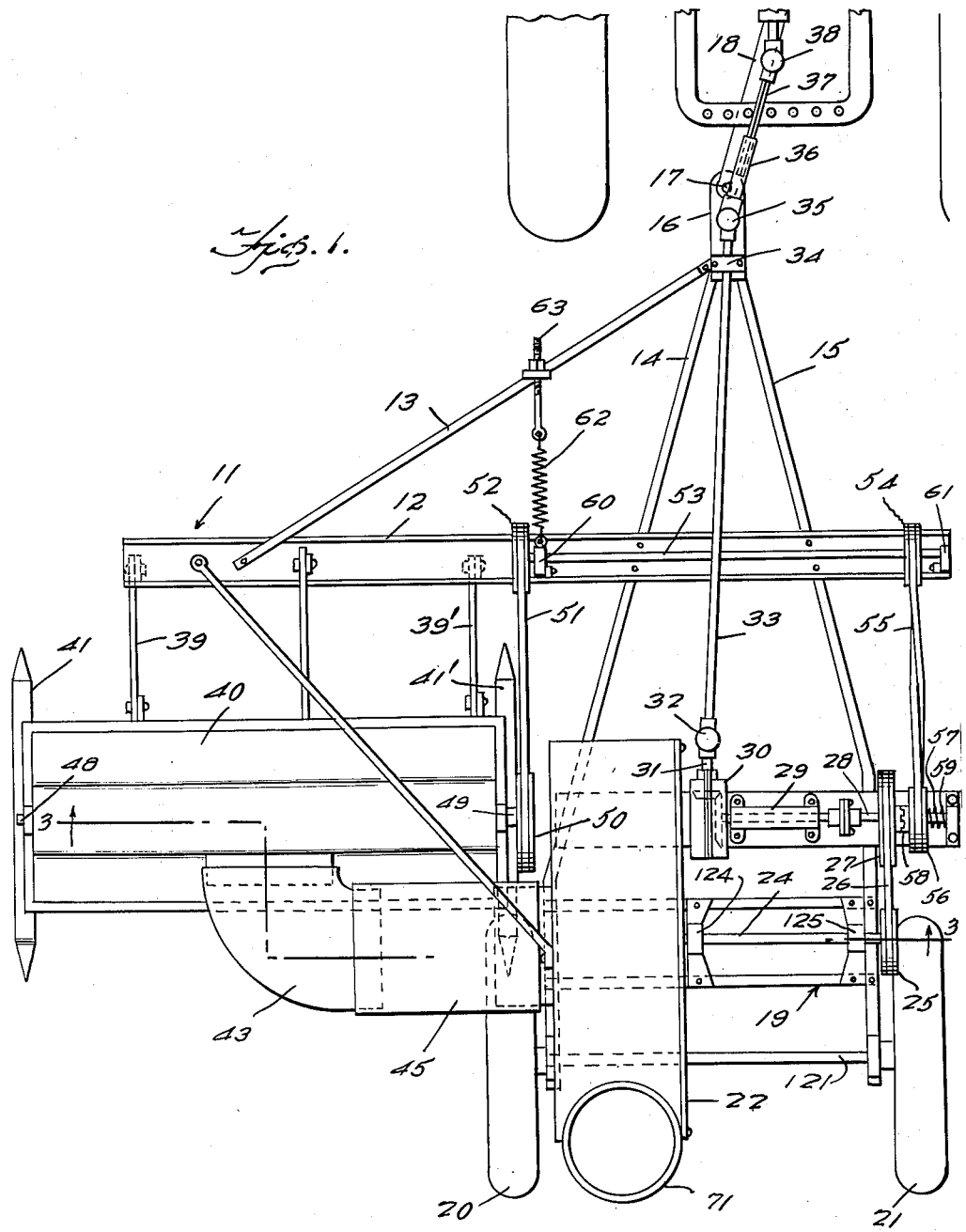
Figure 1 is a top plan view of a pneumatic tractor-drawn harvesting machine constructed in accordance with the present invention with the tractor partly shown.

Referring to the drawings, 11 designates the frame of the machine, said frame comprising a transverse channel bar 12 connected by bars shown respectively at 13, 14 and 15 to a drawbar bracket 16 which is pivotally connected at 17 to the drawbar 18 of a conventional tractor. Frame 11 also includes a sub-frame 19 secured to the rear end portions of bars 14 and 15 and supported on the ground-engaging wheels shown at 20 and 21 by an axle 121.

Mounted on sub-frame 19 is a blower housing 22 in which is journaled a blower rotor 23 whose shaft, shown at 24, is journaled in bearings at the upper ends of standards 124 and 125 upstanding from the sub-frame 19 and provided with a pulley 25. Pulley 25 is coupled by a belt 26 to a pulley 27 carried on a shaft 28 rotatably mounted in a bearing 29 mounted on the rear portion of sub-frame 19. Shaft 28 is coupled through a right-angled gear-reduction unit 30 to a shaft 31. Shaft 31 is connected through a universal joint 32 to a shaft element 33 extending loosely through a U-bracket 34 secured to drawbar bracket 16. The end of shaft element 33 is connected through a universal joint 35 to an internally-squared sleeve member 36 which slidably but non-rotatably receives a square shaft element 37. Shaft element 37 is connected by a universal joint 38 to the power take-off shaft 137 of the tractor.

Secured to channel bar 12 by rearwardly-extending link bars 39, 39' is the intake nozzle member 40, said nozzle member comprising a rigid housing open at its bottom and supported for longitudinal movement with the skids 41, 41'. The lower transverse margins of nozzle member 40 comprise hinged flaps 42, 42', as shown in Figure 5. The top end of nozzle member 40 is formed with a discharge conduit 43. The intake conduit of blower housing 22 is shown at 44. Conduits 43 and 44 are placed in communication by a sleeve 45 which is rigidly secured to conduit 43 but is slidable on conduit 44, whereby relative axial movement between nozzle 40 and the blower intake conduit 44 is permitted.

Nozzle member 40 is provided in its side walls with roller bearings 46. Designated at 47 is a beater rotor having end stub shaft elements 48 and 49 journaled in said roller bearings. Shaft element 49 carries a pulley 50 which is coupled by a belt 51 to a pulley 52 carried on a shaft 53 supported by channel bar 12. Shaft 53 also carries a pulley 54. Pulley 54 is coupled by a crossed belt 55 to a pulley 56 rotatably and slidably carried on a shaft 57 mounted on the sub-frame 19 in axial alignment with shaft 28. Pulley 56 has a toothed clutch sleeve element 58 which is engaged with a similar clutch sleeve element on pulley 27 and is biased into engagement therewith by a coiled spring 59 on shaft 57, as shown in Figure 1.

As shown in Figure 1, shaft 53 is rotatably mounted in brackets 60, 61 which are pivotally connected to channel 12. Bracket 60 is connected to bar 13 by a tensioning spring 62 and an adjustable eye bolt 63, whereby the belts 51 and 55 are kept taut by the action of said spring, the tension of the belts being regulated by adjusting the eye bolt 63.

Rotor 47 has opposing helical flanges 64, 64' to which are secured the respective flexible beater strips 65, 65'. Said strips may be made of rubber or similar yieldable material, the outer edges of said strips being preferably toothed or serrated, as shown at 66. Secured within nozzle member 40 over the rotor 47 is a curved shield or baffle plate 67 terminating at 68, as shown in Figure 5, and defining a relatively narrow intake passage 69 with respect to the rear wall of the nozzle member 40. The top of baffle plate 67 is formed with a downwardly and forwardly-inclined flat top wall element 70, defining a collection space for stones and other debris thrown upwardly through passage 69 by the action of beater rotor 47 and by the suction provided by the blower.

In operation, beater rotor 47 rotates counter-clockwise, as viewed in Figure 5, loosening the seeds carried by plant stalks over which the nozzle member 40 is being drawn. The loosened seeds are drawn upwardly through nozzle member 40 by the suction of blower rotor 23 and pass through conduit 43, sleeve 45 and conduit 44 into blower casing 22. The seeds are blown out of the blower housing through the discharge conduit thereof, shown at 71, and are deposited in a suitable receptacle, not shown.

While a specific embodiment of a tractor-drawn suction-type seed harvesting machine has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A suction-type harvester adapted to be towed and driven by an agricultural tractor having a power take-off connection comprising a wheel-supported frame including a drawbar bracket for connection to an associated tractor, a blower including a housing mounted on said frame and provided with an inlet and an outlet and a rotor journaled in said housing, a ground-supported housing connected to said frame for up-and-down movement relative to the latter and having an open bottom, end walls and a discharge conduit, conduit means connecting the discharge conduit of said ground-supported housing to the inlet of said blower housing for limited freedom of movement of said ground-supported housing relative to said blower housing, a rotary beater disposed in said ground-supported housing adjacent the open bottom of the latter and journaled at its ends in the end walls of said ground-supported housing, and drive means mounted on said frame and connected to said blower rotor and said rotary beater for drivingly connecting the power take-off connection of an associated tractor to said rotor and said beater, said ground-supported housing also having a front wall and a rear wall, and a baffle extending transversely of said ground-supported housing above said rotary beater and between said end walls with one edge spaced from said rear wall to provide a narrow intake passage and with its other edge secured to said front wall, said baffle sloping downwardly and forwardly toward said front wall to provide thereabove a receptacle for stones thrown by said beater through said intake passage.

2. In a vacuum harvester including a wheel-supported frame and a suction blower mounted on said frame and provided with an inlet and an outlet, a ground-supported housing pivotally connected to said frame and having an open bottom and a discharge conduit connected to the inlet of said blower, said ground-supported housing also having end walls and a front and a rear wall, a rotary beater disposed in said housing adjacent the open bottom of the latter and journaled at its ends in said end walls, and a baffle extending transversely of said housing from one end wall to the other and having one edge secured to said front wall and its other edge spaced from said rear wall to provide a restricted inlet passage between said rear wall and said other edge thereof, said baffle being inclined downwardly toward said front wall to provide thereabove a receptacle for receiving stones thrown by said beater through said inlet passage.

3. In a vacuum harvester including a wheel-supported frame and a suction blower mounted on said frame and provided with an inlet and an outlet, a ground-supported housing pivotally connected to said frame and having an open bottom and a discharge conduit connected to the inlet of said blower, said ground-supported housing also having end walls and a front and a rear wall, a rotary beater disposed in said housing adjacent the open bottom of the latter and journaled at its ends in said end walls, and a baffle extending transversely of said housing from one end wall to the other and having one edge secured to said front wall and its other edge spaced from said rear wall to provide a restricted inlet passage between said rear wall and said other edge thereof, said baffle being inclined downwardly toward said front wall to provide thereabove a receptacle for receiving stones thrown by said beater through said inlet passage and said beater including spirally-shaped beater strips of flexible material extending from one end to the other of the beater in mutually opposed relationship to each other.

CLARENCE T. MANNING.

REFERENCES CITED

The following references are of record in the file of this patent:

UNITED STATES PATENTS

| Number | Name | Date |
|---|---|---|
| 1,220,132 | Jenkins | Mar. 20, 1917 |
| 1,331,710 | Isom | Feb. 24, 1920 |
| 1,370,919 | Schaefer | Mar. 8, 1921 |
| 1,418,476 | Schaefer | June 6, 1922 |
| 1,418,542 | Dill | June 6, 1922 |
| 2,046,932 | Wyatt et al. | July 7, 1936 |
| 2,274,340 | Moots | Feb. 24, 1942 |
| 2,352,854 | Miller | July 4, 1944 |
| 2,481,652 | Fort | Sept. 13, 1949 |
| 2,495,417 | McConnel et al. | Jan. 24, 1950 |
| 2,496,022 | Remonte | Jan. 31, 1950 |